United States Patent [19]

Priluck

[11] Patent Number: 5,527,590
[45] Date of Patent: Jun. 18, 1996

[54] LATTICE BLOCK MATERIAL

[76] Inventor: Jonathan Priluck, 37 Antwerp St., Brighton, Mass. 02135-1326

[21] Appl. No.: 312,224

[22] Filed: Sep. 26, 1994

Related U.S. Application Data

[63] Continuation-in-part of Ser. No. 33,111, Mar. 18, 1993, abandoned.

[51] Int. Cl.⁶ ........................................................ B32B 9/00
[52] U.S. Cl. ........................ 428/198; 428/192; 428/193; 428/194; 428/196; 428/229; 428/251; 428/256; 245/2; 140/5; 140/6; 140/7; 140/9; 140/92.1; 140/109; 52/693; 52/637; 52/638; 52/643; 52/646; 52/657; 52/660; 52/664
[58] Field of Search ................................ 428/192, 194, 428/196, 229, 193, 251, 256, 198; 52/693, 637, 638, 643, 646, 657, 660, 664, 696; 140/5, 6, 7, 9, 92.1, 109; 245/2

[56] References Cited

U.S. PATENT DOCUMENTS

| | | | |
|---|---|---|---|
| 1,842,121 | 1/1932 | Riley | 219/56 |
| 2,068,675 | 1/1937 | Heller | 140/92.2 |
| 2,693,205 | 11/1954 | Coulter | 222/484 |
| 3,298,402 | 1/1967 | Hale | 140/5 |

*Primary Examiner*—Patrick J. Ryan
*Assistant Examiner*—Abraham Bahta
*Attorney, Agent, or Firm*—Damon J. Borrelli

[57] ABSTRACT

Disclosed is a structural material having a wire lattice configuration. The structural material can manufactured by first weaving a continuous wire filament on a loom assembly. Once woven into arrays of parallel wires, the filament is fixed in position and cut into segments. The segments are then placed in a rig. The rig positions the segments at relative angles so as to form a matrix or mesh. In the final step of the manufacturing process, the wires are welded together using, for example, a forge press. Alternatively, the material can be formed by first holding wire segments in a pair of rigs and then sequentially welding the wire segments together. The structural material of the invention can be used alone or layered to form a multilaminate material.

13 Claims, 6 Drawing Sheets

LATTICE BLOCK MATERIAL

CROSS-REFERENCE TO RELATED APPLICATIONS

This application is a continuation-in-part of U.S. patent application Ser. No. 08/033,111, filed Mar. 18, 1993.

BACKGROUND OF THE INVENTION

1. Field of the Invention

The present invention relates to structural materials and a method for their manufacture. More particularly, the invention is directed to a structural material having a multi-dimensional lattice configuration and a method for its fabrication.

2. Description of the Prior Art

The search for lighter and stronger materials has been a major focus in the field of material science for many years. To date, research in this area has primarily focused on the use of metals, plastics, and ceramics. This research has resulted in the improvement of existing technologies. In addition, it has produced new materials and processes to satisfy the changing engineering and economic needs of modern society.

More recently activity in the area of materials science, as regarding superior strength-to-weight characteristics, has primarily focused on hydrocarbon based polymers and related chemical processes. Although the materials and methods developed by this research can be both useful and effective under selected conditions, they do not typically address the problem of improving higher-order structures. Further, the goal of many of these materials and processes remains the reproduction of metallic mechanical characteristics using carbon-based chemical formulation techniques. As a result, many of these materials provide only nominal improvement over other more readily available metallic structural materials.

A need has arisen for a high-strength, light-weight structural material which can be manufactured at economically feasible rates and costs.

SUMMARY OF THE INVENTION

It is an object of the present invention to provide a high-strength light-weight structural material.

It is a further object of the invention to provide a light-weight structural material configured as a multidimensional lattice.

It is another object of the invention to provide a method for the manufacture of a high-strength, light-weight structural material.

It is a yet another object of the invention to provide a method for the manufacture of a high-strength, light-weight structural material configured as a multidimensional lattice.

The structural material of the present invention is characterized by a wire lattice. Typically, the wire lattice is configured in the shape of uniformly stacked pyramids in a three dimensional array. Each pyramid is composed of eight wire segments joined together at their vertices. The wire segments are part of a continuous wire filament. Although, the configuration of the material is such that it appears solid to the naked eye, it is, in fact, composed of a three-dimensional network of minute wires. These wires are typically brass or stainless steel. Preferably, the material is composed of structural members about 0.005 to 0.01 inches in diameter and 0.03 to 0.09 inches long.

The material of the present invention is approximately one fifth as dense as solid steel, yet comparable in strength. These characteristics result from a multiplicity of factors. For example, forces on the material are transferred in the same manner as forces on a conventional size truss or space frame. Further, the small cross-sectional area of the wires results in a high surface to volume ratio. In addition, isolation of elements reduces the propagation of flaws through the material as well as assisting in the even transfer of loads. Finally, the low crosssectional size of the wires used to produce the material, preferably less than about 0.01 inches in diameter, results in superior strength characteristics as the wires' small grain size inhibits crack propagation.

The invention also contemplates methods of manufacture. Under a first methodology, the process of the invention includes providing a rig capable of receiving a series of slide blocks and a loom in which the slide blocks can be positioned. Next, fine wires are mounted on the loom and then weaved. Following weaving the wires are welded together. The resulting sheets can then be used as desired or shaped as necessary to produce a corrugated material. In an alternative embodiment of the method of the invention, the material of the invention can be produced in elongate sections using an appropriate support and welding assemblies. These elongate sections can then be corrugated or shaped as desired. Individual steps of these methods of the invention are discussed in detail below.

Referring to a first method of the invention, in the first step a rig and several slide blocks are assembled. These apparatuses serve to hold the wires under tension and in the proper configuration prior to welding. The rig is a generally flat ring having three sets of opposing tracks with T-slots set at 120 degree intervals. The slide block assemblies, which are sized and shaped to fit in the tracks of the rig, have a series of parallel grooves to captivate the wires and hold them precisely in place.

In the next step, the loom, consisting of three grooved uprights on a rotating trigonal platform, is prepared. More particularly, the loom is prepared such that it includes three uprights having locating surfaces onto which the slide block assemblies are locked before the wire is drawn off the spool. As the loom, and hence uprights, rotate the wire progresses down the grooves of the slide blocks so that after one revolution the wire passes into the next lowest groove.

Once positioned on the loom, the wire is cut adjacent to the slide blocks. Next, the slide blocks are mounted on the previously prepared rig so as to form a wire grid or matrix. The vertices of the wire matrix, i.e., the point at which the wires overlap, are then connected utilizing a forging-press. The forge-press supplies uniform heat and pressure to all the joints at once in order to achieve a weld at each vertex. Once all the vertices are joined, the material can be removed from the slide blocks and rig.

The flat material produced using the process of the invention can be used in isolation as a structural material. Alternatively, the resulting material can be bent using a press, punch and die, or by passage through a set of saw-toothed rollers to form corrugated sheets. This latter material can be stacked with, and joined to, alternating flat sheets of the material to form a thicker three dimensional material.

To commence the alternative method of the invention, a first set of wires is positioned on a second support rig. Next, a wire is positioned on a first support rig. The first and second support rigs are then moved into juxtaposition such that the wires on the second rig are oriented at a relative angle of about sixty (60) degrees to the wire on the first rig. At the points of intersection, the wires on the second rig are welded to the wire on the first rig. Welding can be done wire-by-wire, or in groups, as desired. When welding is completed, the wires in the second rig are pulled forward so that the wire in the first rig can be moved into an adjacent groove. A second wire is then placed in the first rig and the welding procedure repeated. This procedure continues until a sub-assembly of desired size including two sets of welded wires is produced.

In the next phase of this method of the invention, a third set of wires is welded to the two wire sub-assembly discussed above. Once again, a wire is positioned on the first support rig. The first and second support rigs are then moved into juxtaposition such that all of the wires are oriented at relative angles of about sixty (60) degrees. That is, so that a series of equilateral triangles are formed. At the points of intersection, the wires are again welded together. As noted above, welding can be done wire-by-wire, or in groups, as desired. When welding of the wires is completed, the finished material is released from the support rigs.

The material produced using the alternative method of the invention can also be used in isolation as a structural material. Alternatively, the resulting material can be bent using a press, punch and die, or by passage through a set of saw-toothed rollers to form corrugated sheets. This latter material can be stacked with, and joined to, alternating flat sheets of the material to form a thicker three dimensional material.

Other general and specific objects of the invention will in part be obvious and will in part appear hereinafter.

The invention accordingly comprises the method and apparatus embodying steps, features of construction, combinations of elements, and arrangements of parts adapted to effect such steps, as exemplified in the following detailed disclosure, the scope of the invention is indicated in the claims.

BRIEF DESCRIPTION OF THE DRAWINGS

For a fuller understanding of the nature and objects of the invention, reference should be made to the following detailed description and the accompanying drawings, in which.

DESCRIPTION OF PREFERRED EMBODIMENTS

Figure 1:
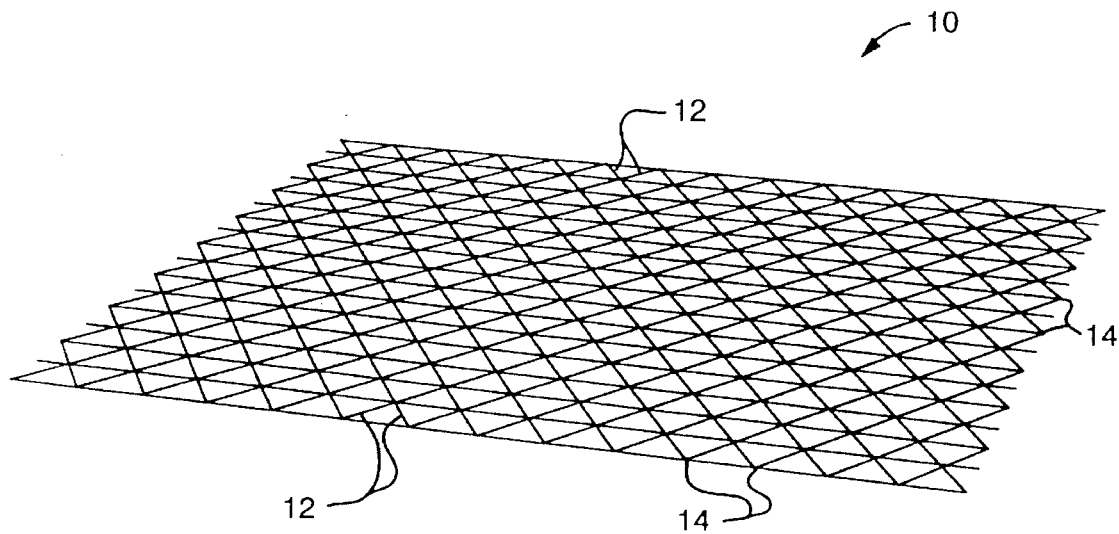
FIG. 1 is a perspective view of one embodiment of the structural material of the invention.

Referring to FIGS. 1 through 8 wherein like reference numerals refer to like parts, there is illustrated a structural material 10 embodying the present invention. The structural material 10 is fabricated from a lattice of fine wire segments 12 joined at their vertices 14. The fine wire segments 12 are sections of a continuous wire filament 16.

Figure 2:
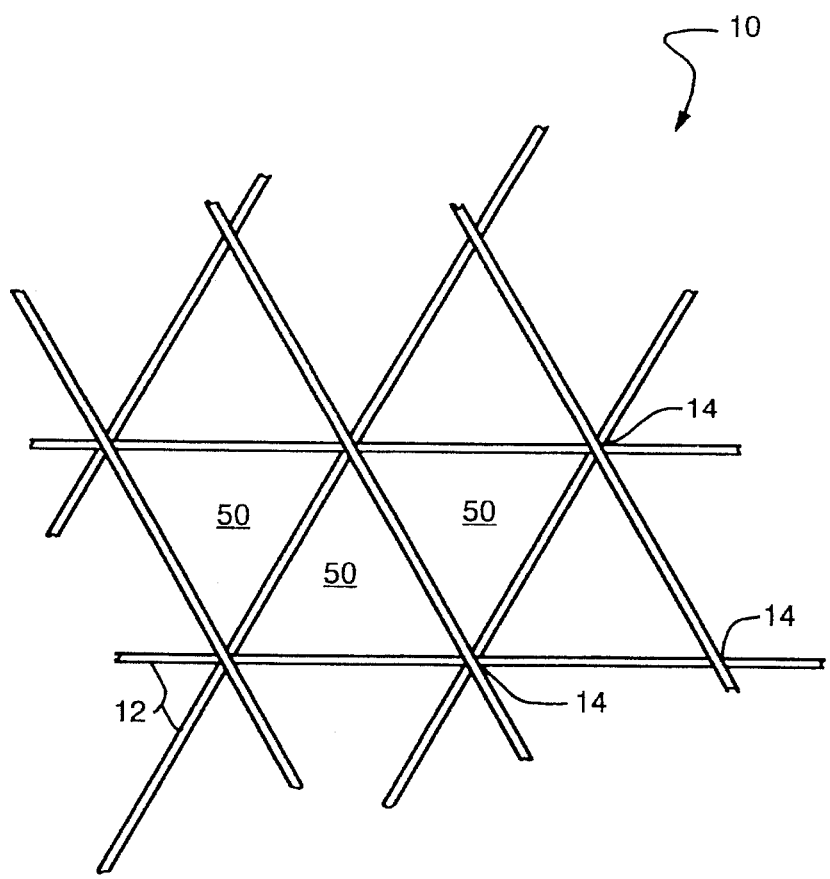
FIG. 2 is a magnified top plan view of a section of the structural material of FIG. 1.
Figure 3:
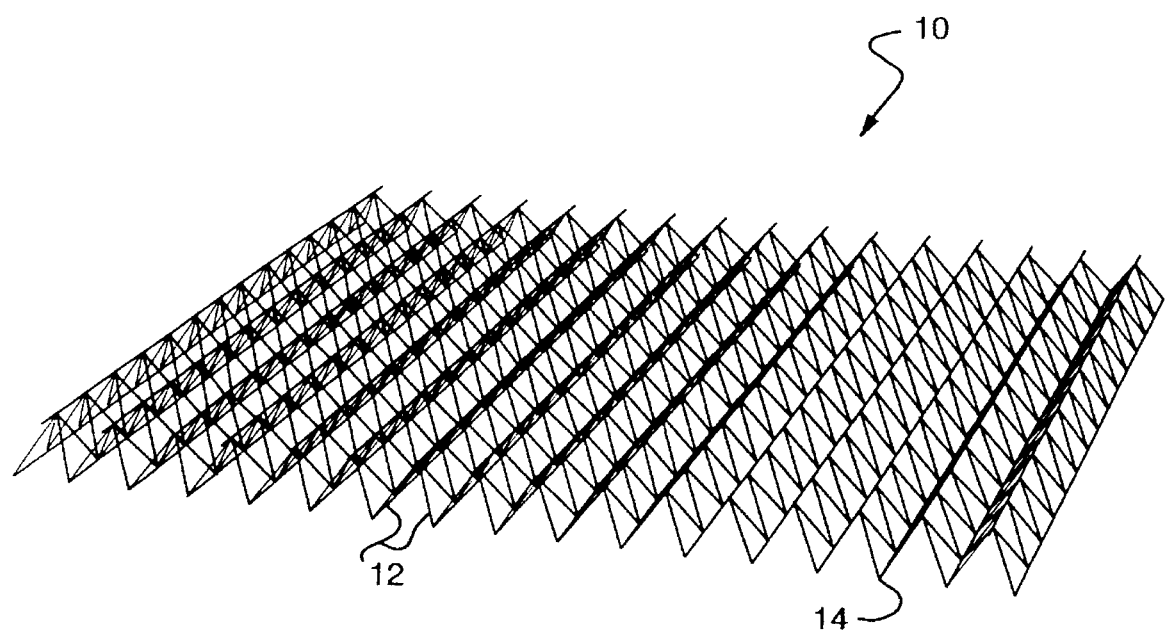
FIG. 3 is a perspective view of another embodiment of the structural material of the invention having a corrugated crosssectional configuration.
Figure 4:
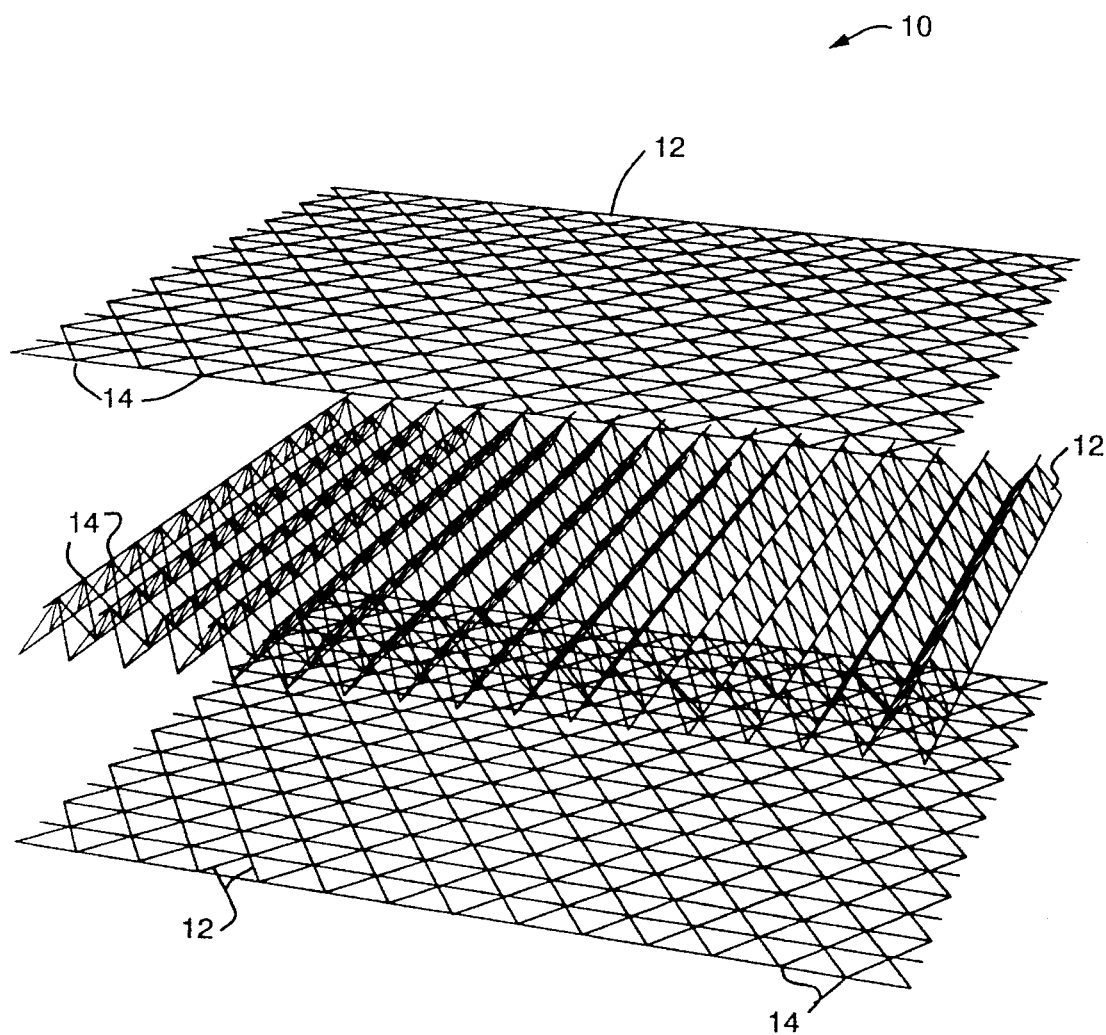
FIG. 4 is a perspective, exploded view of another embodiment of the structural material of the invention having alternating layers of the embodiments of the invention shown in FIGS. 1 through 3.
Figure 5:
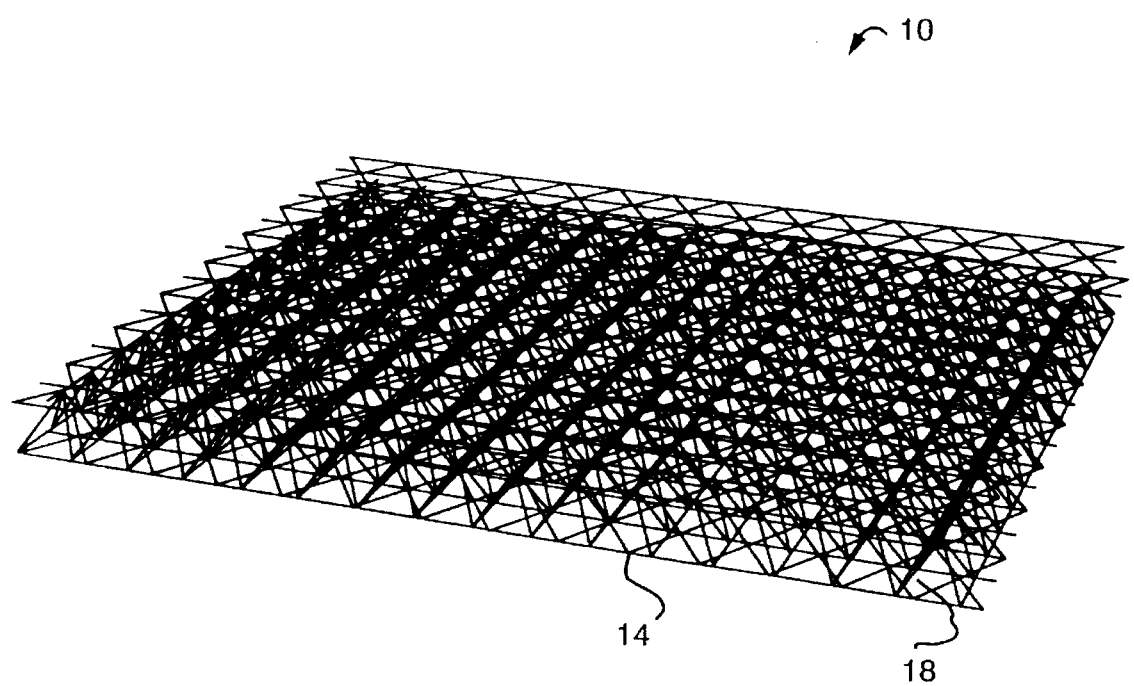
FIG. 5 is perspective, assembled view the embodiment of the structural material of the invention shown in FIG. 4.
Figure 6:
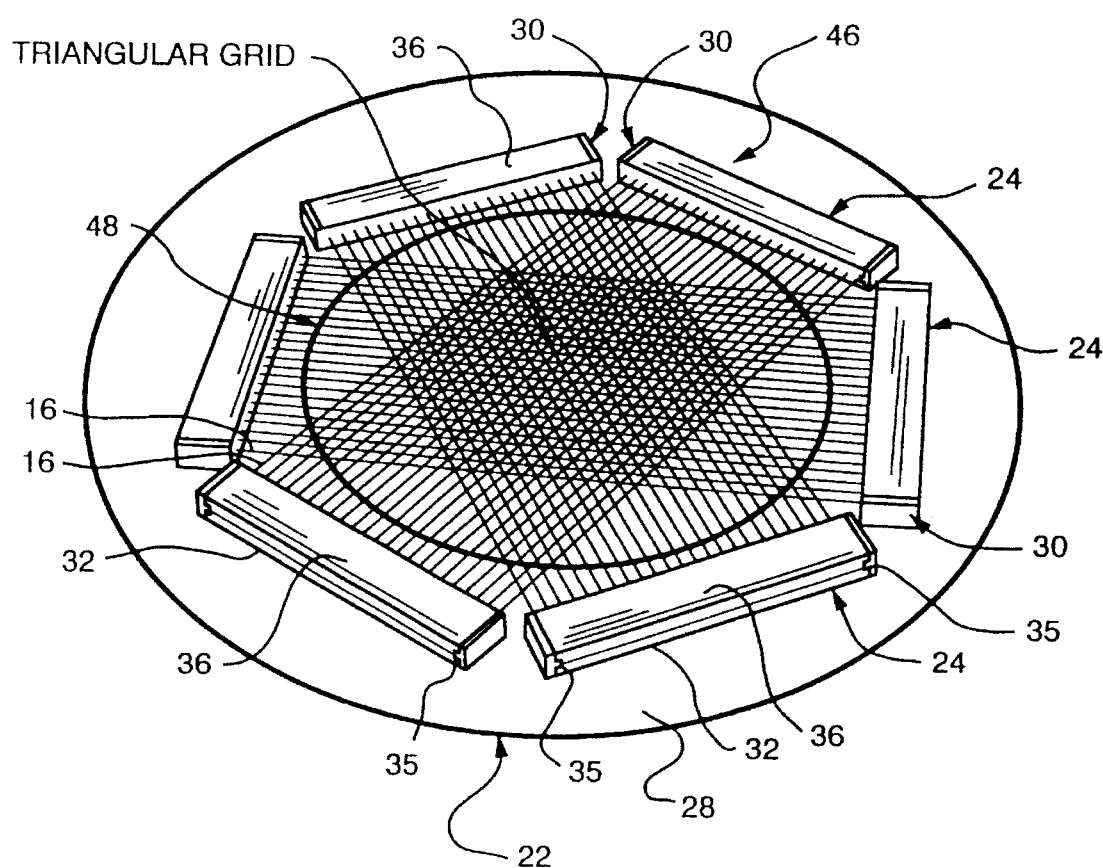
FIG. 6 is a perspective view of the rig, used to manufacture the structural material of the invention by employing a first method of the invention, with the slide blocks and wire filaments in position for forging.

As shown by FIGS. 1 through 5, the structural material 10 is characterized by a lattice of fine wire segments 12. As shown in FIGS. 1 through 3, the structural material 10 can be planar or corrugated depending on the engineering application intended. In larger, more complex embodiments of the invention, as shown in FIGS. 4 and 5, the structural material 10 has a multi-laminate configuration consisting of uniformly stacked pyramids 18 in a three dimensional array. Each pyramid 18 is composed of eight wire segments 12 joined together at their vertices 14. In all these embodiments the fine wire segments 12 are typically brass, stainless steel, or EDM wire. Preferably, the fine wires 12 are between 0.005 and 0.01 inches in diameter. Further, the wire segments 12 are typically between 0.02 and 0.1 inches long. A presently preferred wire material has a diameter of 0.008 and is manufactured from stainless steel.

The invention also contemplates alternative methods for the manufacture of the structural material 10. A first method uses rig 22 and loom 26 assemblies described in detail below. An alternative method uses support rigs 70 and 72, depicted in FIGS. 8A and 8B, to produce the material of the invention.

To commence a first method for the manufacture of the material of the invention, a rig 22 is provided that is adapted to receive a series of slide blocks 24. In addition, a loom 26 in which the slide blocks 24 can be positioned during initial weaving is prepared. In the next step of the process of the invention, a continuous wire filament 16 is mounted for weaving. The wire filament 16 is then drawn into the loom 26 and weaved as required. Following weaving the wire filaments 16 are positioned on the rig 22 and connected, typically welded, at the vertices 14 of the wire segments 12. The resulting sheets can then be used as desired or shaped as necessary to produce a multi-laminate material. Individual steps of the procedure of the invention are discussed in detail below.

In the first step of the procedure of the invention the rig 22 and slide blocks 24 are assembled. Shown in FIGS. 6 and 7, these apparatuses serve to hold the wire filaments 16 under tension and in the proper orientation prior to welding. Generally, the rig 22 is a flat ring 28 having three sets of opposing tracks 30 including T-slots 35. The tracks 30 are set at intervals of 120 degrees. This angle is selected so that when three sets of slide blocks 24 having wire filaments 16 extending therefrom are positioned in the rig 22 the intersecting wire segments 12 form a multiplicity of equilateral triangles.

The slide blocks 24 each have a first portion 32 including a surface 33 having series of parallel grooves 34 to captivate the wire filaments 16 and hold them precisely in place. A second face 37, located on the obverse of each of the slide blocks 24 is configured to be mountable on the uprights 38 of the loom 26 described in detail below. Each slide block 24 also includes a second portion 36 configured to fit over the first portion 32. The second portion 36 is sized and shaped to interferringly engage the wire filaments 16 when the weaving described below is completed. The first and second portions 32 and 36 can be connected using, for example, machine screws, bolts, and other fasteners familiar to those skilled-in-the-art.

Figure 7:
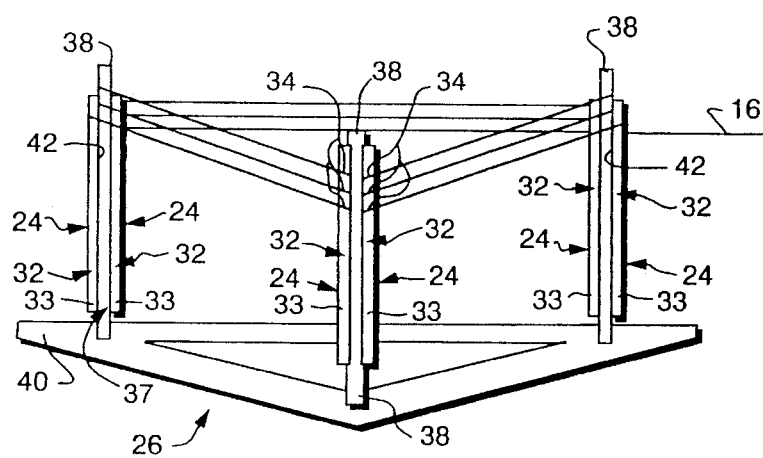
FIG. 7 is a perspective view of the loom, used to manufacture the structural material of the invention by employing a first method of the invention, with the wire filament weaved onto a section of the slide blocks.

Next, the loom 26, depicted in FIG. 7, consisting of three uprights 38 on a rotating trigonal platform 40, is prepared. Each upright 38 has a locating surface 42 onto which the first portions 32 of the slide blocks 24 are fixed before the wire filament 16 is drawn into the loom 26. The locating surfaces 42 on uprights 38 are configured to secure the slide blocks 24 with their grooved surfaces 33 facing outwardly. In operation, each of the second faces 37 of the first portions 32 of the slide blocks 24 is placed in contact with a surface of one of the uprights 38 to prepare the loom 26 for weaving. The slide blocks 24 can be secured to the uprights 38 using, for example, machine screws, bolts, and other fasteners familiar to those skilled-in-the-art.

In the next step of the method of the invention, loom 26, and hence uprights 38, are rotated so as to draw the wire filament 16 over the grooves 34 of the slide blocks 24. In particular, the loom 26 is rotated such that after one revolution the wire filament 16 passes into the next lowest groove 34 of each slide block 24. This procedure continues until all of the grooves 34 of the slide blocks 24 contain a portion of the wire filament 16. During weaving the wire filament 16 is preferably maintained at a tensile stress of between about 0.05 and 0.2 ounces. By following this procedure, between each of the uprights 38 is formed a parallel array of the wire filament 16.

Once the wire filament 16 is positioned on the loom 26 in the parallel array, the second portion 36 of each of the slide blocks 24 is placed over each the first portions 32. The wire filament 16 is thus fixed in position for further processing. Subsequently, the wire filament 16 is cut. More particularly, the wire filament 16 is cut along the uprights 38 using, for example, a welding torch. This action creates three independent sections 46 including a slide block 24 on either end of a wire section 48. The slide blocks 24 are then released from the locating surfaces 42 and moved to the rig 22.

In the next step of the method of the invention, the slide blocks 24 and wire sections 48 are mounted on the rig 22 and the wire sections 48 are interconnected utilizing a forging-press. In particular, the slide blocks 24 are positioned in the T-slots 35 of tracks 30. Like the T-slots 35, slide blocks 24 and wire sections 48 are mounted on the rig 22 at relative angles of 120 degrees. Positioning in this way creates a trigonal grid of wire segments 12 having the configuration of a multiplicity of equilateral triangles 50. Each triangle 50 shares three vertices 14 with those triangles 50 adjacent to it. Once all of the wire segments 12 are properly oriented, a forge-press familiar to those schooled-in-the-art is utilized to supply heat and pressure to all the vertices 14 at the same time. Preferably, the press provides about 50 pounds of pressure per square inch and 1250 degrees Fahrenheit heat. Welding of the wire segments 12 is preferably done under a vacuum. Once all the vertices 14 are joined, the resulting structural material 10 can be removed from the rig 22 and, eventually, slide blocks 24.

Figure 8A:
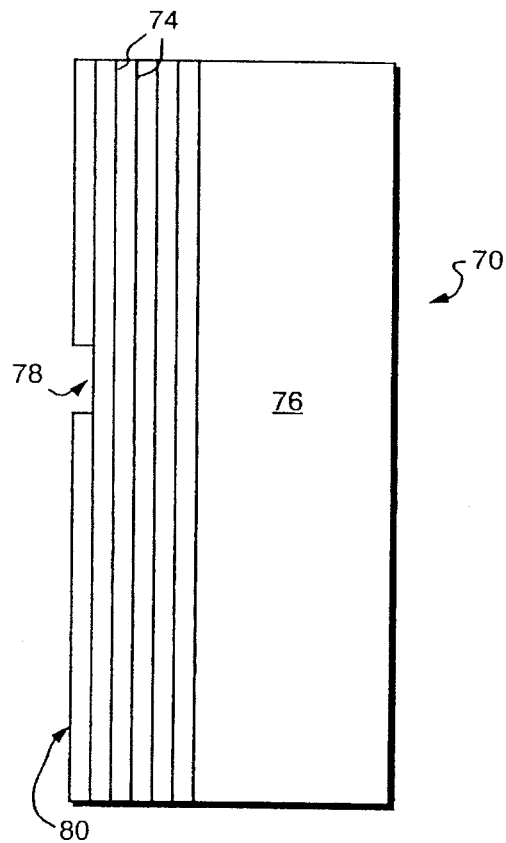
FIG. 8A and 8B are top plan views of first and second support rigs used to manufacture the structural material of the invention by employing the alternative method of the invention.
Figure 8B:
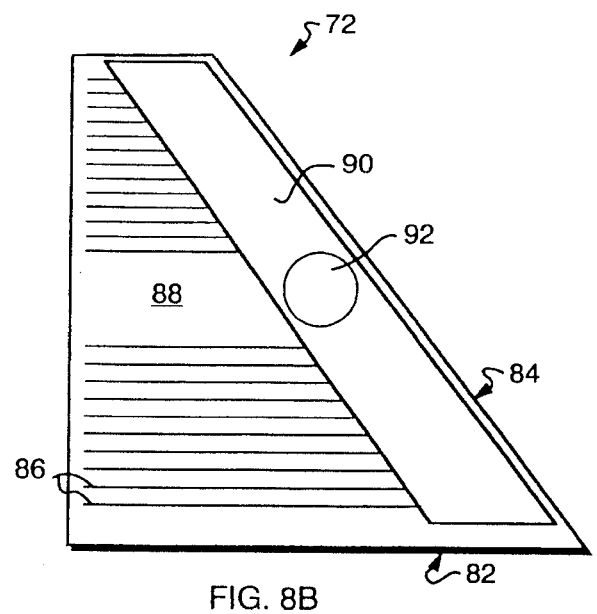

FIGS. 8A and 8B depict support rigs 70 and 72 that can be used in an alternative method of the invention to manufacture the material of the invention.

Referring to FIG. 8A, the support rig 70 has a generally rectangular configuration. A series of grooves 74 are cut into the surface 76 of the rig 70. Those skilled-in-the-art will appreciate that the size of the grooves 74 is determined by the size of wire being used to construct the material, and lattice, of the invention. The grooves 74 are equally spaced over surface 76. Generally, the separation distance between the grooves 74 is determined by the desired characteristics of the material, and lattice, being constructed. Typically, the grooves 74 are separated by between about 0.03 and about 0.07 inches. Preferably, the grooves 74 are separated by about 0.05 inches. The grooves 74 are parallel. A slot 78 is lanced into an edge 80 of the rig 70 to provide access for a welding electrode (not shown).

Referring to FIG. 8B, the support rig 72 has a polygonal configuration with at least two sides 82 and 84 being oriented at an angle relative to each other. The angle between sides 82 and 84 of the support rig 72 is selected such that when wires are positioned on the rig 72 they will be oriented at about sixty (60) degrees relative to a wire placed on support rig 70. The rig 72 also has a series of grooves 86 cut into one of its surfaces 88. Once again, those skilled-in-the-art will appreciate that the size of the grooves 86 is determined by the size of wire being used to construct the material, and lattice, of the invention. The grooves 86 are equally spaced over surface 88. The separation distance between the grooves 86 is determined by the desired characteristics of the material, and lattice, being constructed. Typically, the grooves 86 are separated by between about 0.03 and about 0.07 inches. Preferably, the grooves 86 are separated by about 0.05 inches. The grooves 86 are parallel. A flange 90, held in position by screw 92, extends across a portion of the surface 88 of the support rig 72. In operation, the flange 90 and screw 92 cooperate to secure the wires positioned on the rig 70.

To commence the alternative method of the invention, a first set of wires is positioned in the grooves 86 of the rig 72. Once positioned, flange 90 is placed over the wires and secured using the screw 92. Next, a wire is positioned in the groove 74 closest to the edge 80 of the rig 70. The first and second rigs 70 and 72 are then moved into juxtaposition such that the wires overlap and are oriented at a relative angle of about sixty (60) degrees. Preferably, wires held in rig 72 overlap the wire held in rig 70. At the points of intersection, the wires are then welded together. Welding can be done wire-by-wire, or in groups, as desired.

When welding of the wires held in the rigs 70 and 72 is completed, the wire sub-assembly is moved such that the wire in the rig 70 rests one groove 74 in from the edge 80. A new wire is then positioned in the groove 74 closest to the edge 80 and the welding procedure commences again. In this manner successive wires held in the first rig 70 are attached to the wires held in the second rig 72.

In the next phase of the method of the invention, a third set of wires is attached to the sub-assembly of wires produced as described above. To perform this assembly procedure, a wire is again positioned in the groove 74 closest to the edge 80 of the rig 70. The first and second rigs 70 and 72 are again moved into juxtaposition such that all the wires overlap and are oriented at relative angles of about sixty (60) degrees. At the points of intersection, the wires are then welded together. Welding can be done wire-by-wire, or in groups, as desired.

When welding of the wires is completed, the material 10 of the invention is removed from the rigs. The material 10 can then be further processed as desired.

The structural material 10 produced using the processes of the invention can be in isolation, as shown in FIG. 1. Alternatively, the structural material 10 can be corrugated, as depicted in FIG. 3, using, for example, a press, punch and die, or by passage through a set of saw-toothed rollers to form corrugated sheets. Preferably, the corrugated embodiment of the structural material 10 shown in FIG. 3 is produced by placing the flat structural material shown in FIG. 1 through a rolling press. The rolling press has a generally flat male portion and a curved female portion. The curved female portion tangentially contacts the flat male portion along a single line. In operation, the structural material 10 is bent along the line of contact between the male and female portions of the press. This configuration is preferred as it permits the structural material 10 to contract as it is bent.

The structural material 10 produced using the process of the invention can also be used to form a larger multi-laminate structure, as shown in FIGS. 4 and 5. In this embodiment, alternating layers of the flat structural material 10 of FIG. 1 is joined to the corrugated structural material 10 of FIG. 3. To form this material, the layers are first stacked together as shown in FIG. 4. Next, the loose material 10 is placed in the forge press and welded in accordance with the procedure set forth above in connection with the procedure for forming a single sheet of structural material 10.

The following is an illustrative, non-limiting example of the procedure for making a material of the invention.

EXAMPLE I

To commence the manufacturing procedure a section of wire was inserted into each of the grooves cut into the surface of a second support rig (FIG. 8B). A single wire was placed in the first groove of a first support rig (FIG. 8A). The wires placed in both rigs were manufactured from stainless steel, had a diameter of 0.008 inches, and were purchased from All Stainless Co., Hingham, Mass. Next, using a straight edge, the end of the wires positioned in the second rig were aligned such that each wire extended approximately 0.01 inches over the edge of the rig. The wires positioned in the second rig were then brought into contact with the single wire placed in the first rig. In particular, the wires were oriented such that the wires in the second rig were at a relative angle of sixty (60) degrees to the wire in the first rig.

In the next step of the procedure, an electrode was brought into contact with the wires in the second rig and the single wire in the first rig. More particularly, at each point of intersection an electrode was positioned such that it exerted a pressure of five (5) pounds on the wire junction. The electrode was connected to a power supply able to provide a controlled percentage of the wall current, ranging from one (1) to ninety-nine (99) percent in one (1) percent increments, for a controlled number of sixty (60) hertz cycles (each cycle being approximately 16.7 milliseconds), ranging from one (1) to seventy (70) cycles in one (1) cycle increments. Using the power supply, a current equal to fifty-five (55) percent of the standard wall current was then delivered to the intersection point for one (1) cycle. The procedure was repeated until all of the intersection points had been welded together.

In the final phase of the assembly procedure, the subassembly of the first and second wires was repositioned in the second rig. A third wire was then placed in the first rig. At each point of intersection, an electrode was again placed in contact with the wires such that it exerted a pressure of five (5) pounds on each wire junction. A current equal to about sixty-five (65) percent of the standard wall current was delivered to the intersection point for one (1) cycle using the power supply discussed above. The procedure was repeated until all of the intersection points had been welded together.

It will thus be seen that the invention efficiently attains the objects set forth above, among those made apparent from the preceding description. In particular, the invention provides a high strength light-weight structural material and an efficient method for its production.

It will be understood that changes may be made in the above construction and in the foregoing sequences of operation without departing from the scope of the invention. It is accordingly intended that all matter contained in the above description or shown in the accompanying drawings be interpreted as illustrative rather than in a limiting sense.

It is also to be understood that the following claims are intended to cover all of the generic and specific features of the invention as described herein, and all statements of the scope of the invention which, as a matter of language, might be said to fall therebetween.

Having described the invention, what is claimed as new and secured by Letters Patent is:

1. A structural material formed from a lattice of fine wires, said structural material comprising a first, a second, and a third series of interconnected continuous fine wire segments, said wire segments being welded together at their points of intersection, at least two of any of said first, second, or third series of wire segments being disposed at an angle relative to each other of approximately sixty degrees, said first, second and third series of wire segments being affixed together so as to form a three-dimensional, continuous array of trigonal structures, said three-dimensional, continuous array of trigonal structures being in the form of a series of equilateral triangles.

2. The wire lattice of claim 1 wherein said first, second, and third series of wire segments are formed from a material selected from the group consisting of brass, stainless steel, and EDM wire.

3. The wire lattice of claim 2 wherein said material forming said first, second and third series of wire segments has a diameter of between about 0.005 inches and about 0.01 inches.

4. The wire lattice of claim 3 wherein said material forming said first, second and third series of wire segments has a diameter of between about 0.008 inches.

5. The wire lattice of claim 1 wherein the distance between said points of intersection of said first, second, or third series of wire segments is between about 0.01 inches and 0.1 inches.

6. A method for the manufacture of a structural material, said material being formed from a three-dimensional, continuous fine wire lattice, said method comprising the steps of:

a.) providing a rig, said rig having an annular configuration and at least three sets of opposing tracks, each said track being sized and shaped to receive a slide block, said sets of opposing tracks being disposed at relative angles of 120 degrees to each other;

b.) providing said slide blocks, said slide blocks having a first portion including a series of parallel grooves on a first face and a second portion configured to interferringly engage said first face of said first portion;

c.) providing a loom, said loom having at least three grooved uprights on a rotating trigonal platform, said uprights including locating surfaces configured to securingly receive one of each of said first portions of said slide blocks;

d.) drawing a fine wire filament into said loom and into said grooves in said first face of said first portion of said slide blocks;

e.) securing said fine wire filaments in said slide blocks by placing said second portion of said slide blocks in interfering engagement with said first faces of said first portions of said slide blocks and cutting said wire filaments adjacent to the slide blocks;

f.) mounting said slide blocks in said opposing sets of tracks on said rig so as to form a wire matrix of said fine wire filaments, said slide blocks being mounted on said rig such that said wire filaments secured in said rig intersect at angles of approximately 120 degrees, said wire filaments forming said structural material, said structural material having a substructure formed from a three-dimensional, continuous array of equilateral trigonal structures; and g.) welding said fine wire filaments together so as to form said structural material, said material having a substructure including said three-dimensional, continuous array formed from said fine wire lattice and having a substantially flat configuration.

7. The method of claim 6 further including the step of bending the fine wire lattice so as to form a fine wire lattice having an undulating configuration.

8. The method of claim 7 further including the step of welding a first section of a wire lattice having said flat configuration to one side of said fine wire lattice having said undulating configuration.

9. The method of claim 8 further including the step of welding a second section of said wire lattice having said flat configuration to a second side of said fine wire lattice having said undulating configuration, said second side of said fine wire lattice having said undulating configuration being disposed opposite to said first side of said fine wire lattice having said undulating configuration.

10. A method for the manufacture of a structural material, said material having a substructure formed from a fine wire lattice, said method comprising the steps of:

a.) providing a first rig, said first rig having a series of grooves for receiving a first series of fine wires;

b.) providing a second rig, said second rig having a series of grooves for receiving a second series of fine wires;

c.) positioning a series of wires in said grooves of said second rig and securing said series of wires in position;

d.) positioning a fine wire segment in a groove of said first rig;

e.) moving said first and second rigs into juxtaposition such that said series of wires in said second rig are oriented at a relative angle of 60 degrees to said fine wire segment in said first rig;

f.) welding said series of wires in said second rig to said fine wire segment in said first rig;

g.) continuously inserting fine wire segments into said first rig and welding said fine wire segment to said series of wires in said second rig so as to form a subassembly of welded wires;

h.) positioning said sub-assembly of welded wires, said sub-assembly including said series of wires held in said second rig and said wire segments held in said first rig, in said second rig;

i.) positioning a third wire segment in said first rig;

j.) welding said sub-assembly of wires to said third wire segment positioned in said first rig;

k.) continuously inserting a series of wire segments into said first rig and welding said wire segments to said sub-assembly of welded wires so as to form a three-dimensional, continuous array of said wire segments and said sub-assembly of wires, said array having a substantially flat configuration;

l) releasing said array from the first and second rigs.

11. The method of claim 10 further including the step of bending the fine wire lattice so as to form a fine wire lattice having an undulating configuration.

12. The method of claim 11 further including the step of welding a first section of a wire lattice having said flat configuration to one side of said fine wire lattice having said undulating configuration.

13. The method of claim 12 further including the step of welding a second section of said wire lattice having said flat configuration to a second side of said fine wire lattice having said undulating configuration, said second side of said fine wire lattice having said undulating configuration being disposed opposite to said first side of said fine wire lattice having said undulating configuration.

* * * * *